US010270564B2

United States Patent
Djukic et al.

(10) Patent No.: US 10,270,564 B2
(45) Date of Patent: Apr. 23, 2019

(54) SYSTEM AND METHOD FOR MULTI-LAYER PROTOCOL SELECTION (71) Applicant: Huawei Technologies Co., Ltd., Shenzhen (CN)

(72) Inventors: Petar Djukic, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 13/795,793

(22) Filed: Mar. 12, 2013

(65) Prior Publication Data
US 2014/0269767 A1  Sep. 18, 2014

(51) Int. Cl.
*H04L 1/18* (2006.01)

(52) U.S. Cl.
CPC .......... *H04L 1/1896* (2013.01); *H04L 1/1825* (2013.01); *H04L 1/1819* (2013.01)

(58) Field of Classification Search
None
See application file for complete search history.

(56) References Cited

U.S. PATENT DOCUMENTS

| 6,374,311 | B1* | 4/2002 | Mahany et al. | 710/18 |
| 6,611,522 | B1* | 8/2003 | Zheng | H04L 45/742 370/395.21 |
| 6,697,986 | B2 | 2/2004 | Kim et al. | |
| 6,711,180 | B1* | 3/2004 | Delesalle | H04Q 11/0478 370/310.1 |
| 7,032,153 | B1* | 4/2006 | Zhang | H04L 1/0018 714/749 |
| 7,200,154 | B1* | 4/2007 | Wu | H04W 28/24 370/252 |
| 2002/0040396 | A1* | 4/2002 | Yoshihara | H04L 41/0893 709/225 |
| 2002/0150040 | A1* | 10/2002 | Tong | H04L 1/0069 370/216 |
| 2004/0184471 | A1* | 9/2004 | Chuah et al. | 370/420 |
| 2005/0249117 | A1* | 11/2005 | Gerkins | H04L 47/6215 370/230 |
| 2006/0187870 | A1 | 8/2006 | Zhu et al. | |

(Continued)

FOREIGN PATENT DOCUMENTS

CN  1992608 A  7/2007
CN  1996823    7/2007
(Continued)

OTHER PUBLICATIONS

Leon-Garcia, Alberto et al., Communication Networks: Fundamental Concepts and Key Architectures, 2nd Edition, McGraw-Hill, 2004, New York, NY, 128 pages.

(Continued)

*Primary Examiner* — James P Duffy
(74) *Attorney, Agent, or Firm* — Slater Matsil, LLP (57) ABSTRACT

A system and method for transmitting data is provided. An embodiment comprises a dynamic determination of ARQ and HARQ protocols in order to achieve a wider range of Quality of Service guarantees. The ARQ and HARQ protocols can be selected base on Quality of Service requirements of packets and the capabilities of the piece of user equipment.

26 Claims, 7 Drawing Sheets

| Present Traffic | Very Latency Tolerant | Latency Tolerant | Latency Sensitive | Latency Intolerant |
|---|---|---|---|---|
| Very error tolerant | No PARQ, No HARQ | No PARQ, Classic HARQ | No PARQ, Classic HARQ • No BLER Target | |
| Error tolerant | PARQ, No HARQ • Very long ARQ timer | PARQ, Classic HARQ • Long ARQ timer • Low BLER target | PARQ, Classic HARQ • Short ARQ timer • Low BLER target | |
| Error sensitive | | | | |
| Error intolerant | | | | |

(56) References Cited

U.S. PATENT DOCUMENTS

| | | | |
|---|---|---|---|
| 2007/0081455 A1* | 4/2007 | Kashima | H04L 29/06 370/229 |
| 2007/0115823 A1 | 5/2007 | Shen | |
| 2007/0168826 A1* | 7/2007 | Terry et al. | 714/748 |
| 2008/0005638 A1 | 1/2008 | Kuo et al. | |
| 2008/0198814 A1* | 8/2008 | Wengerter | H04L 47/14 370/336 |
| 2009/0103635 A1* | 4/2009 | Pahalawatta | H04L 1/007 375/240.27 |
| 2009/0228755 A1* | 9/2009 | Franovici | 714/751 |
| 2009/0300453 A1 | 12/2009 | Sahara | |
| 2010/0284272 A1 | 11/2010 | Wang | |
| 2012/0039301 A1 | 2/2012 | Kim et al. | |
| 2012/0044828 A1* | 2/2012 | Seo et al. | 370/252 |
| 2014/0133391 A1 | 5/2014 | Djukic et al. | |

FOREIGN PATENT DOCUMENTS

| | | |
|---|---|---|
| CN | 101064664 A | 10/2007 |
| CN | 101351984 A | 1/2009 |
| CN | 101494877 A | 7/2009 |
| CN | 101594637 A | 12/2009 |
| CN | 1019385341 | 1/2011 |
| EP | 1871032 A1 | 12/2007 |
| WO | 2011087905 | 7/2011 |

OTHER PUBLICATIONS

The Institute of Electrical and Electronics Engineers, Inc., "IEEE Standard for Information Technology—Telecommunications and Information Exchange Between Systems—Local and Metropolitan Area Networks—Specific Requirements, Part 2: Logical Link Control," ANSI/IEEE Std. 802.2, IEEE Computer Society, May 1998 Edition, 253 pages.

Varnica, Nedeljko et al., "LDPC Code Ensembles for Incremental Redundancy Hybrid ARQ," International Symposium on Information Theory, Sep. 2005, pp. 995-999.

ETSI, "Digital cellular telecommunications system (Phase 2+); General Packet Radio Service (GPRS); Mobile Station (MS)—Base Station System (BSS) interface; Radio Link Control/ Medium Access Control (RLC/MAC) protocol (3GPP TS 04.60 version 8.27.0 Release 1999)" ETSI TS 101 349, Version 8.27.0, Sep. 2005, 302 pages.

ETSI, "LTE; Evolved Universal Terrestrial Radio Access (E-UTRA); Radio Link Control (RLC) protocol specification (3GPP TS 36.322, Version 11.0.0, Release 11)," ETSI TS 136 322 v11.0.0, Oct. 2012, 42 pages.

ETSI, "LTE; Evolved Universal Terrestrial Radio Access (E-UTRA); Medium Access Control (MAC) protocol specification (3GPP TS 36.321, Version 10.6.0, Release 10)," ETSI TS 136 321 v10.6.0, Oct. 2012, 56 pages.

ETSI, "LTE; Evolved Universal Terrestrial Radio Access (E-UTRA) and Evolved Universal Terrestrial Radio Access Network (E-UTRAN); Overall description; Stage 2 (3GPP TS 36.300, Version 11.3.0, Release 11)," ETSI TS 136 300 v11.3.0, Nov. 2012, 217 pages.

Kim, Dongmyoung et al., "CL-ARQ: Efficient ARQ for Two-Layer Retransmission Schemes," Proceedings of the 2007 International Conference on Wireless Communications and Mobile Computing, Honolulu, Hawaii, Aug. 12-16, 2007, 6 pages, DOI: 10.1145/1280940.1280954.

Wang, Ling et al., "Research on the Cross-layer HARQ Retransmission Technology in LTE System," Journal of Chinese Computer Systems, vol. 31, No. 11, 2010, 5 pages.

Zheng, Haitao et al., "Optimizing the ARQ Perfomance in Downlink Packet Data Systems With Scheduling," IEEE Transactions on Wireless Communications, vol. 4, Issue No. 2, Mar. 2005, pp. 495-506.

* cited by examiner

| Present Traffic | Very Latency Tolerant | Latency Tolerant | Latency Sensitive | Latency Intolerant |
|---|---|---|---|---|
| Very error tolerant | No PARQ, No HARQ | No PARQ, Classic HARQ<br>•No BLER Target | No PARQ, Classic HARQ<br>•No BLER Target | No PARQ, classical HARQ<br>•_______ |
| Error tolerant | PARQ, No HARQ<br>•Very long ARQ timer | PARQ, Classic HARQ<br>•Long ARQ Timer<br>•Low BLER target | PARQ, Classic HARQ<br>•Short ARQ timer<br>•Low BLER target | No PARQ, classical HARQ<br>•_______ |
| Error sensitive | No PARQ, Rateless HARQ<br>•Long ARQ Timer | PARQ, Classic HARQ<br>•_______<br>•Medium BLER target | PARQ, Classic HARQ<br>•Short ARQ time<br>•Medium BLER target | No PARQ, classical HARQ<br>•_______ |
| Error intolerant | No PARQ, Rateless HARQ<br>•Long ARQ Timer | PARQ, Classic HARQ<br>•Long ARQ Time<br>•Very low BLER target | PARQ, Classic HARQ<br>•Short ARQ Time<br>•Very low BLER target | No PARQ, classical HARQ<br>•_______ |

Figure 3A

| Device class | User class | Channel | Traffic type | PARQ | HARQ | QoS |
|---|---|---|---|---|---|---|
| Very low | Low | Any | Latency tolerant | AM | None | None |
| Any | Low | Any | Latency tolerant | TM | Rateless | None |
| Any | High | Good | Latency intolerant (gaming) | TM | Reliable | Minimize delay |
| Any | Any | Good | Error intolerant (TCP) | AM | Any | Any |
| Any | Any | Good | Error tolerant (VoIP, Live video) | UM | Reliable | Maximize S.E. s.t. error rate |
| High | High | Good | High rate (video) | UM | Any | Maximize S.E. s.t. delay |

SYSTEM AND METHOD FOR MULTI-LAYER PROTOCOL SELECTION

TECHNICAL FIELD

The present invention relates to a system and method of wireless communication, and, in particular embodiments, to a system and method for wirelessly transmitting data packets.

BACKGROUND

As the use of wireless technology has grown, there has been an increase in the amount of data that is being used by wireless devices, which must be transferred over the wireless networks. Also the traffic comprises many different types, each with a unique Quality-of-Service (QoS) requirements that should be met by the network. To accommodate this increase in traffic and the variation in QoS requirements, data streams are generally split up into discreet data packets, which are then transmitted from the transmitter to the receiver. The receiver may treat data packets of one stream differently from other streams to achieve the required QoS requirements for that stream. Once received, the receiver can then take these individual data packets and use them as desired.

However, due to impairments that may arise in the channel during transmission, wireless links may utilize a protocol in order to ensure that individual data packets are not simply lost during transmission. One type of protocol is an Automatic Repeat ReQuest (ARQ) protocol to ensures that data is transmitted reliably between a transmitter and a receiver, such as between a base station and a mobile station. In ARQ protocols the transmitter transmits a coded or uncoded data bits in a frame, or parts of the frame, as many times as required for the receiver to correctly receive the uncoded data bits. A frame refers to bits, which is delimited with a clear start and an end. In upper layers, the frame is also referred to as a packet. In lower layers, the frame is also referred to as a transport block (TB).

ARQ protocols can be classified into pure ARQ protocols and hybrid ARQ (HARQ) protocols. Pure ARQ protocols rely on lower level protocols to provide protection against bit errors, while HARQ protocols use forward error correction (FEC) to provide bit-level error protection. ARQ protocols include Stop-and-Wait, Go-back-N and Selective-Repeat protocols. ARQ protocols use sequence numbers, parity checks on sequence numbers, acknowledgment timers, and state machines to detect packet and acknowledgement losses. The general idea of ARQ protocols is that the packet sender keeps retransmitting a packet or packets until it receives the correct acknowledgment(s). The receiver acknowledges packets with an acknowledgment signal. The approach of retransmitting a packet until it is acknowledged may potentially result in a very high number of retransmissions and thus high latency in ARQ protocols.

Unlike ARQ protocols, where each frame's retransmission is treated independently of other frame transmissions of the same frame, in HARQ protocols, the receiver decodes received copies of the frame, or partial copies of the frame, jointly using soft combining. The receiver uses all received coded bits to recover the original data.

However, previous uses of ARQ/HARQ protocols have serious limitations, and may not be able to handle the more stringent requirements that are utilized for greater transmission speeds, higher data loads, and wider range of QoS differentiation than was experienced in previous wireless traffic.

SUMMARY

An embodiment method for wirelessly transmitting data comprising receiving a first data packet to be transmitted and choosing with a processor a combination of a pure Automatic Repeat ReQuest (ARQ) protocol and a hybrid ARQ protocol for the first data packet is provided. The first data packet is packed with the processor with the combination of the pure ARQ protocol and the hybrid ARQ protocol, and the first data packet is transmitted with a transmitter after packing and encoding with the processor.

An embodiment transmitter for transmitting data comprising an antenna and a processor coupled to the antenna is provided. The processor is configured to receive a first data packet to be transmitted and choose a combination of a pure Automatic Repeat ReQuest (ARQ) protocol and a hybrid ARQ protocol for the first data packet. The processor is also configured to pack and encode the first data packet with the combination of the pure ARQ protocol and the hybrid ARQ protocol to form an first encoded data packet and transmit the first encoded data packet to the antenna.

An embodiment method of receiving data comprising receiver with an antenna and a first Automatic Repeat ReQuest (ARQ) combination identifier and determining with a processor coupled to the antenna a combination of a pure ARQ protocol and a hybrid ARQ protocol from the first ARQ combination identifier provided. A first data packet associated with the first ARQ combination identifier is received with the antenna, and the first data packet is unpacked and decoded with the processor with the pure ARQ protocol and the hybrid ARQ protocol.

An embodiment receiver for receiving data comprising an antenna for receiving a wireless transmission of a first data packet and for receiving a first Automatic Repeat ReQuest (ARQ) combination identifier is provided. A processor is coupled to the antenna, the processor configured to determine a combination of a pure ARQ protocol and a hybrid ARQ protocol from the first ARQ combination identifier and unpack and decode the first data packet with the pure ARQ protocol and the hybrid ARQ protocol.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely a protocol selection system and method for wirelessly transmitting with a two-layer ARQ/HARQ architecture. Other embodiments may also be applied, however, to other protocol selection systems and methods.

Figure 1:
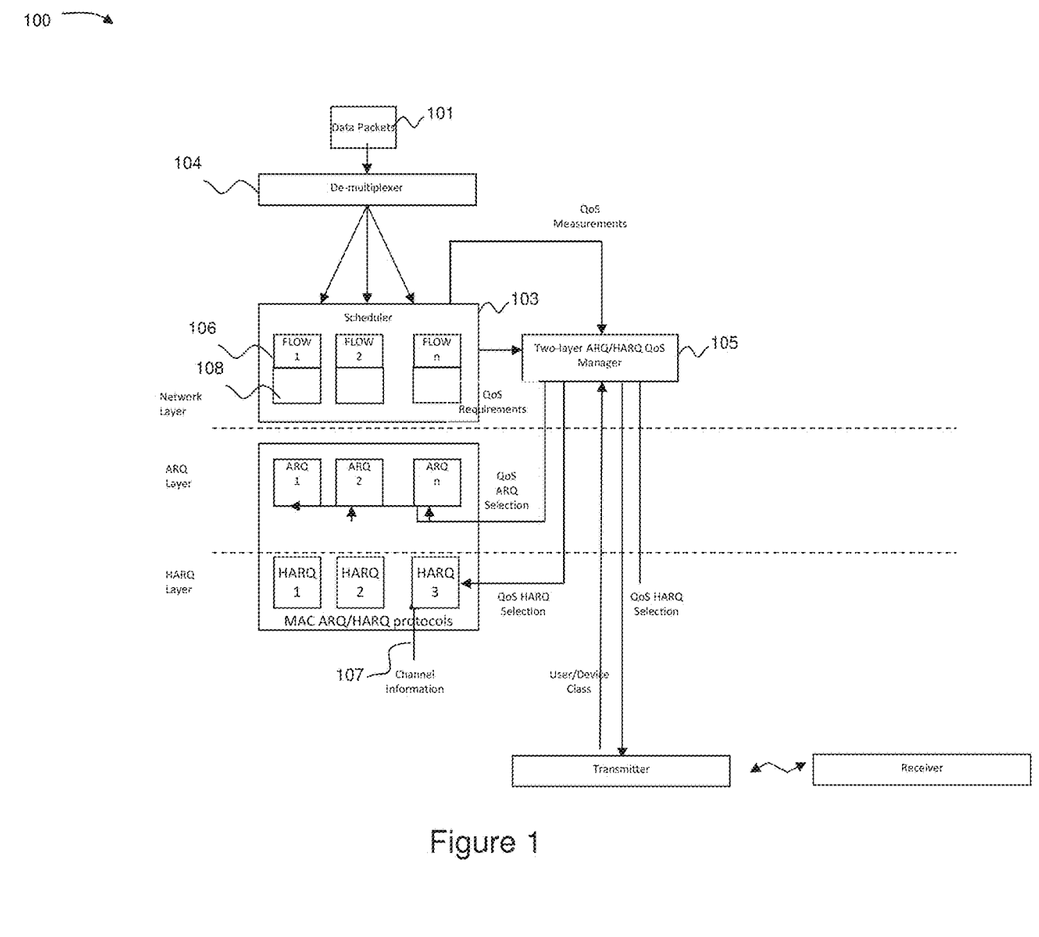
FIG. 1 illustrates a system for transmitting data packets in accordance with an embodiment.

With reference now to FIG. 1, there is shown a system 100 for scheduling data packets 101 to be sent and for choosing a protocol to be used to transmit the data packets 101. The system 100 illustrated in FIG. 1 may be implemented as any device or combination of devices to transmit or receive data packets 101, such as a base station or a mobile station in a wireless network. In a particular embodiment, the transmission portion of the system 100 may be implemented as the base station described below with respect to FIG. 6 while the receiving portion of the system 100 may be implemented as the mobile station described below with respect to FIG. 7.

The data packets 101 may comprise bits of data that are desired to transmitted, and may comprise data that will be used in many different formats. For example, the data packets 101 may comprise data that will be used in sensor reporting, buffered video streaming, TCP-based e-mail, chat, ftp, p2p, conversation voice, conversational video, live video streaming, interactive gaming, real-time gaming, M2M traffic, combinations of these, or the like, although any other type of data usage may alternatively be utilized.

In an embodiment the data packets 101 are sent to a de-multiplexer 104. The de-multiplexer 104 is used to receive the stream of individual data packets 101 from different data flows and place them into separate queues 106 within a scheduler 103 (described further below) based upon the requirements of Quality of Service (QoS) parameters of each of the individual data packets 101. In particular, the de-multiplexer 104 may inspect each of the data packets 101 using a method such as deep packet inspection (DPI) and then, based upon this inspection, place the individual data packets 101 into separate queues 106 based upon a pre-defined flow-to-QoS level mapping, wherein the incoming flows may be identified by a 6-tuple including IP source address, IP destination address, protocol, source port number, destination port number, and differentiated services code point (DSCP). This separates the traffic from one flow into multiple IP QoS flows on a per-packet basis and places these data packets 101 into separate queues 106.

However, as one of ordinary skill in the art will recognize, the above description of using a DPI method is only intended to be illustrative and is not intended to be limiting. Rather, any suitable methods may be utilized to place the individual data packets 101 into separate queues 106. For example, the classification could be performed based on 5-tuple and without the DSCP field. As another example, an application layer DPI may be used to examine the HTML header, which may include the type of video frame in the HTML message, which may also be used as an input. These and any other suitable methods of classifying the individual data packets 101 are fully intended to be included within the scope of the embodiments.

For example, in an embodiment one of the QoS parameter classes may be a first QoS parameter class such as an error class or data packet loss class and comprises four different subclasses based upon how tolerant each data packet 101 is to error.

A first error class may be a very error tolerant class. In this class the transmission of the data packet 101 may experience errors in transmission without degradation of the experience, such as less than about $10^{-1}$. Examples of such data packets 101 that may be classified in the very error tolerant class include some M2M reporting from sensor networks, traffic from bundle protocols used for delay tolerant networking, or the like.

A second error class may be an error tolerant class, in which data packets 101 can tolerate some error but not as much as the data packets 101 in the very error tolerant class. For example, data packets 101 that can tolerate an error of less than about $10^{-2}$ may be placed in the error tolerant class. Examples of data packets 101 that may have this type of tolerance to error include conversational voice using voice-over-IP, real-time gaming, or the like.

A third error class may be an error sensitive class, in which data packets 101 that cannot tolerate the error of the second error class but can still accept some errors. For example, data packets 101 that can tolerate an error of less than about $10^{-3}$ may be classified in the error sensitive class. Examples of data packets 101 that may have this type of tolerance to error include conversational video, live video streaming, interactive gaming, or the like.

A fourth error class may be an error intolerant class, in which data packets 101 that cannot tolerate the error of the third error class. For example, data packets 101 that can tolerate errors of no greater than about $10^{-6}$ may be classified in the fourth error class. Examples of data packets 101 that may have this type of tolerance to error may include buffered video streaming, TCP-based e-mail, chat, ftp, p2p, M2M traffic from medical equipment, or the like.

Furthermore, the error class system with four sub-classes described above is intended to illustrative and are not intended to be limiting upon the present embodiments. Rather, any suitable parameter class and any number of sub-classes (other than four) may alternatively be utilized. All such classes and sub-classed are fully intended to be included within the scope of the embodiments.

Additionally, the de-multiplexer 104 also utilizes a second QoS parameter class, such as a latency class, to classify the individual data packets 101 and place them into their respective queues 106. In an embodiment the second QoS parameter class system is a latency class system and comprises four different sub-classes based upon the latency requirements for each of the data packets 101. A first latency class may be a very latency tolerant class. In this class the transmission of the data packet 101 may experience any type of delays in transmission without affecting the overall quality of the delivery of the data packet 101. Examples of such data packets 101 that may be classified in the very latency tolerant class include certain types of M2M reporting, delay tolerant networking, data-based text chatting applications, social networking updates, or pre-fetching and caching of stored videos.

A second latency class may be a latency tolerant class, in which data packets 101 can tolerate some latency but not as much as the data packets 101 in the very latency tolerant class. For example, data packets 101 that can tolerate a delay of less than about 300 ms may be placed in the latency tolerant class. Examples of data packets 101 that may have this type of tolerance to latency include stored video streaming, TCP-based e-mail, chat, ftp, p2p, or the like.

A third latency class may be a latency sensitive class, in which data packets 101 that cannot tolerate the delays of the second latency class but can still accept some delay. For example, data packets 101 that can tolerate a delay of less than about 100 ms may be classified in the latency sensitive class. Examples of data packets 101 that may have this type of tolerance to latency include conversational voice, conversational video, live video streaming, interactive gaming, or the like.

A fourth latency class may be a latency intolerant class, in which data packets 101 that cannot tolerate the delays of the third latency class. For example, data packets 101 that can tolerate delays of no greater than about 50 ms may be classified in the fourth latency class. Examples of data packets 101 that may have this type of tolerance to latency may include real-time gaming, urgent medical condition reports, or the like.

During classification the de-multiplexer 104 will separate the incoming data packets 101. In a particular example, for a first data packet 101 used to transmit data for real-time gaming, the data will have a QoS parameter such as packet loss with a QoS requirement such as a maximum packet loss no greater than about $10^{-2}$. A second data packet 101 may be used to transmit data for a live video stream, which may have different QoS requirements for the QoS parameter, such as a maximum packet loss requirement no greater than about $10^{-3}$. As such, the de-multiplexer 104 will place the first data packet 101 into a first one of the queues 106 with other data packets 101 having similar QoS requirements as the first data packet 101 (e.g., a packet loss no greater than about $10^{-2}$) and will place the second data packet 101 in a second one of the queues 106 with other data packets having similar QoS requirements as the second data packet 101 (e.g., a packet loss no greater than about $10^{-3}$).

By utilizing the packet loss parameter (with four sub-classes) and the latency parameter (with another four sub-classes), the de-multiplexer 104 can place the individual data packets 101 into one of, e.g., sixteen different queues, with each queue being one combination of one error sub-class and one latency sub-class. However, any suitable number of queues 106, including a single queue, may alternatively be utilized.

Additionally, as one of ordinary skill in the art will recognize, the above description of an error requirement and a latency requirement as the first QoS parameter and the second QoS parameter for the data packets 101 is intended to merely be illustrative and is not intended to be limiting to the embodiments. Rather, any suitable QoS requirement or combination of QoS requirements, such as minimum required data rate, delay jitter, or the like, may alternatively be utilized to arrange the plurality of data packets 101 into the separate queues 106 where the individual data packets 101 share similar QoS requirements with other data packets 101 within the same queue. These alternative requirements are fully intended to be included within the scope of the embodiments.

Optionally, individual ones of the queues 106 may have a plurality of similar QoS parameters. For example, a queue 106 that is transmitting a video stream may contain multiple sub-streams with a plurality of QoS requirements. As another example, the queue 106 may transmit data packets for a video chat with data packets for text messaging and voice chat. As yet another example, interactive gaming (which has a low tolerance for latency) may also contain in-game advertisements (that have a high tolerance for latency). As such, even within a queue 106, the individual data packets 101 may have a plurality of QoS requirements and utilizing the same mode of transmission for each of the individual data packets 101 in a one-size fits all type of mode is not efficient.

The scheduler 103 receives the data packets 101 into the separate queues 106 and inserts a timestamp into each one of the individual data packets 101 in order to keep track of how long each one of the individual data packets 101 has been waiting in its respective queue 106. Additionally, associated with each of the queues 106, a packet scheduler 108 will also prioritize the data packets 101 and determine when to forward each of the individual data packets 101 from the queues 106 to be transmitted (as described further below) and how many of the individual data packets 101 within the queue 106 should be sent at the same time. In an embodiment the packet scheduler 108 may forward individual data packets 101 as a group based upon an algorithm that takes into account such factors as the timestamp of the individual data packets 101, the quality of a transmission channel combinations of these, or the like. Any suitable method of determining which of the individual data packets 101 within the queues will be forwarded for transmission may be utilized, and all such methods are fully intended to be included within the scope of the embodiments.

Additionally, the scheduler 103, based upon its determination, may forward data packets 101 from any combination of the queues 106. For example, the scheduler 103 may forward a data packet 101 from a first one of the queues 106 (e.g., a queue 106 with a QoS requirement of packet loss less than about $10^{-2}$) and also, in the same group of data packets 101, forward a data packet 101 from a second one of the queues 106 (e.g., a queue 106 with a QoS requirement of packet loss less than about $10^{-3}$). Both of these data packets 101 may be forwarded by the scheduler 103 in the same group of data packets 101. Alternatively, the scheduler 103 may schedule data packets 101 from a single queue 106 to be forwarded. Any combination of data packets 101 from the queues 106 may be forwarded for transmission by the scheduler 103.

When data packets 101 are ready to be forwarded the scheduler 103 will forward the QoS parameter requirements to a QoS Manager 105. The QoS Manager 105 is utilized to dynamically determine an appropriate Automatic Repeat ReQuest (ARQ) protocol to be used on the individual data packets 101. In an embodiment the QoS Manager 105 may initially determine which one of a plurality of pure ARQ (ARQ) protocols (including no ARQ protocol) and which one of a plurality of Hybrid ARQ (HARQ) protocols (including no HARQ protocol) to apply to the group of data packets 101.

The scheduler 103, in addition to forwarding the QoS parameter requirements, will also forward to the QoS Manager 105 any QoS measurements for each of the individual data packets 101. For example, for each of the individual data packets 101, the scheduler 103 will also forward the QoS measurements, such as the timestamp for each of the individual data packets 101, that the QoS Manager 105 may need to ensure that the QoS requirements are met (such as forwarding the data packet 101 within a certain amount of time to ensure that the latency requirements are met).

However, forwarding the QoS parameter requirements and the QoS measurements without forwarding the data packets 101 as discussed above is merely one alternative, and is not intended to be limiting to the embodiments. Alternatively, instead of forwarding the QoS parameter requirements and the QoS measurements to the QoS Manager 105 by themselves, the scheduler 103 can also forward the individual data packets 101 themselves to the QoS Manager 105. This and any other suitable combination of sending information to the QoS manager 105 may be used for the QoS manager 105 to make its decisions, and all are fully intended to be included within the scope of the embodiments.

Figure 2:
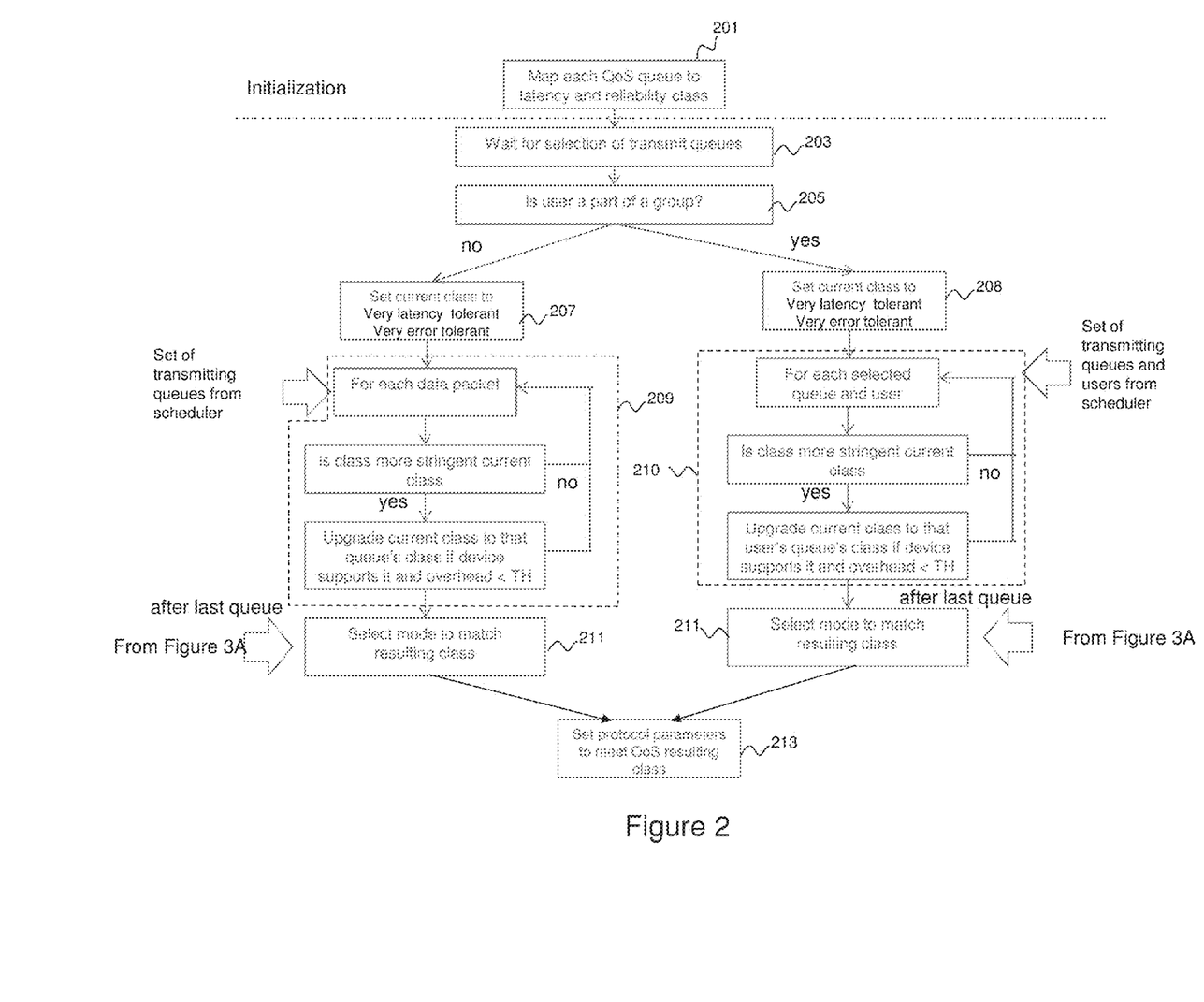
FIG. 2 illustrates a flowchart for choosing protocols in accordance with an embodiment.

FIG. 2 illustrates an algorithm that may be utilized by the QoS Manager 105 to help it determine which ARQ protocol and which HARQ protocol to use for the group of data packets 101. In an embodiment the QoS Manager 105 is initialized in a first step 201 by initially mapping a combination of ARQ protocols and HARQ protocols to each combination of QoS requirements for the QoS parameters (e.g., the latency requirements and the error requirements).

Figure 3A:
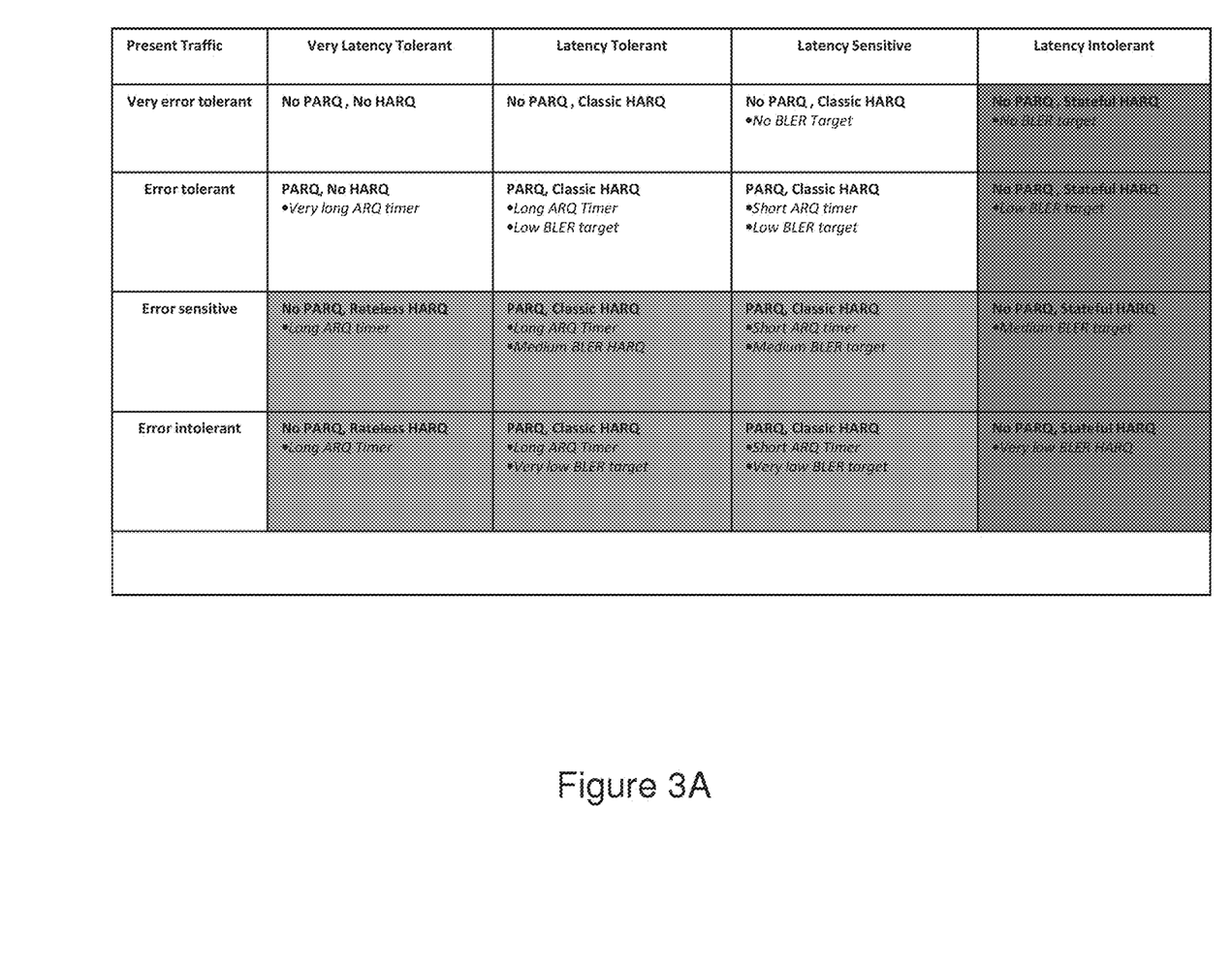
FIGS. 3A-3B illustrate a look up tables that may be used to determine QoS requirements in accordance with an embodiment.

FIG. 3A provides an example of one such mapping. In an embodiment the mapping is based on a look-up table which is pre-defined by the network. Alternatively, the look-up table may be generated and updated dynamically during operation. As can be seen, the first QoS parameter class (e.g., error/packet loss) and its sub-classes are put along a first axis while the second QoS parameter class (e.g., latency) and its sub-classes are put along a second axis. The individual combinations of the first QoS parameter classes and the second QoS parameter classes each have a particular combination of a ARQ protocol and a HARQ protocol that is suited for its transmission. For example, a data packet 101 within the very latency tolerant class and within the very error tolerant class may be best suited to be transmitted with no ARQ protocol and no HARQ protocol. Additionally, a data packet 101 within the latency sensitive class and within the error intolerant class may utilize a combination of ARQ and classic HARQ protocols (as described further below).

In another embodiment the mapping may be performed using formulas instead of a table. For example, formulas such as Equation 1 and Equation 2 may be utilized:

$$ARQ_{selection} = \begin{cases} NoARQ, & K_1(T_{max} - D_{HOL}) - K_2\log_{10}(PL) > Th_{ARQ} \\ ARQ, & K_1(T_{max} - D_{HOL}) - K_2\log_{10}(PL) \le Th_{ARQ} \end{cases} \quad \text{Eq. 1}$$

$$HARQ_{selection} = \begin{cases} NoHARQ, & K_3(T_{max} - D_{HOL}) + K_4\log_{10}(PL) > Th_{HARQ} \\ HARQ, & K_3(T_{max} - D_{HOL}) + K_4\log_{10}(PL) \le Th_{HARQ} \end{cases} \quad \text{Eq. 2}$$

where $T_{max} - D_{HOL}$ is the difference between the allowed delay and the current head-of-line delay. The formulas for $HARQ_{selection}$ and $ARQ_{selection}$ indicate if HARQ and ARQ should be used, and the effect of the formulas is to chose ARQ and HARQ when the bound on delay is large, and choose ARQ for small values of packet loss (PL) and HARQ for larger values of PL. However, more or less elaborate formulas may also be utilized to select the type of ARQ and HARQ.

Additionally, the mapping of a ARQ protocol and a HARQ protocol in the table illustrated in FIG. 3 optionally includes a mapping of internal settings for each of the chosen protocols. For example, when a ARQ protocol utilizing a timer is chosen, a further determination may be made as to the settings of the ARQ timer. As a particular example, for the very latency tolerant class or latency tolerant class, when a ARQ protocol is used, the ARQ timer may be set as either a very long ARQ timer (e.g., longer than about 100 ms), or may be set as a long ARQ timer (e.g., between about 50 ms and about 10 ms). Additionally, for the latency sensitive class, the ARQ timer may be set as a short ARQ timer, such as between about 10 ms and about 50 ms. Any suitable number of settings may be utilized.

Internal settings for the HARQ protocol may also be mapped. In a particular example using a Block Error Rate (BLER) target, when a HARQ protocol is chosen, the settings for the BLER target may also be adjusted for the particular first QoS parameter class and the second QoS parameter class. For example, the HARQ protocol may have no BLER target, may have a very low BLER target (e.g., between about 0.001 and about 0.01), may have a low BLER target (e.g., between about 0.01 and about 0.1), or may have a medium BLER target (e.g., between about 0.1 and about 0.3). Any other suitable settings may alternatively be utilized.

The settings for the BLER target for the HARQ protocol may be set, at least in part, based upon feedback from the transmission. In particular, channel information 107 (see FIG. 1) such as a signal to noise (SNR) ratio may be fed back to the system 100 and utilized in the selection or evaluation of the HARQ protocol chosen (as described further below). The channel information 107 may then be utilized to help set the internal settings for the HARQ protocol that has been chosen, and these internal settings may be mapped in the initial mapping of the first step 201 of FIG. 2.

Returning now to FIG. 2, once initialized, the QoS Manager 105 will wait for the scheduler 103 to transmit the information and/or the selected group of data packets 101 in a second step 203. Once the QoS Manager 105 receives the group of data packets 101 from the scheduler 103, the QoS Manager 105 makes a determination as to whether the transmit queue is part of a group in a third step 205. If the answer is no, each of the QoS parameter classes are set at the most tolerant level in a fourth step 207. For example, in an embodiment in which the first QoS parameter is error and the second QoS parameter is latency, the first QoS parameter class is set to the very latency tolerant class and the second QoS parameter class is set to the very error tolerant class.

After actually receiving the information and/or the group of data packets 101 from the scheduler 103, the QoS Manager 105 will, for each individual data packet 101, determine if the class for the group of data packets 101 is stringent enough to satisfy the requirements of that data packet 101 in a fifth step 209. If it is, then the scheduler 103 will move on to the next one of the group of data packets 101. If the current data packet 101 being examined is less tolerant to latency than the very latency tolerant class that was initially set, and needs a more stringent class, than the current class for the whole group of data packets 101 is upgraded to the more stringent class for the current data packet 101 being examined. Optionally, this may be limited to changing to a more stringent class if the devices (e.g., the first transmitter 603 or the second receiver 705 that will be sending or receiving the data packets 101) can support the more stringent class (e.g., if the overhead is less than 10% of the total packet size).

This process is repeated for each of the data packets 101 until the QoS Manager 105 has determined the most lenient class of each of the QoS parameter classes that will satisfy the QoS requirements for all of the data packets 101 within the group of data packets 101. These represent the QoS parameter classes that will be used in the transmission of the group of data packets 101.

Alternatively, the scheduler 103 can determine in the third step 205 that the group of data packets 101 is intended to be transmitted to a group of receivers instead of to a single receiver, such as by being transmitted as an multicast or broadcast type of transmission. In this embodiment a similar process is began, with each of the QoS parameter classes being set at the most tolerant level in a seventh step 208. However, instead of simply determining whether each of the QoS parameter classes for the group of data packets 101 meets the QoS parameter classes for each individual data packet 101 within the group, the QoS Manager 105 determines if the current QoS requirements for the group of data packets 101 is stringent enough to meet the QoS requirements for each data packet 101 and also for each device in the group of receivers that will receive the group of data packets 101 in an eighth step 210.

Figure 3B:
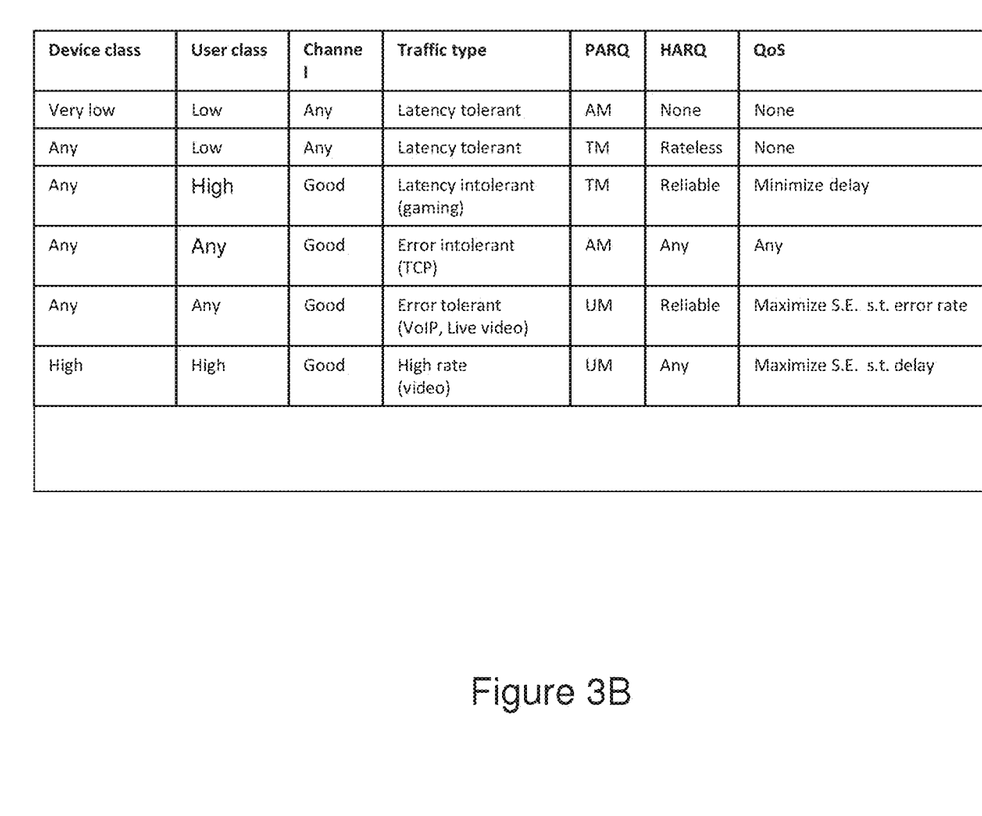

For example, FIG. 3B illustrates another table that may be used to determine the QoS requirements for each device in a group of receivers. In an embodiment each of the devices within the group of receivers may be classified based upon the class of the device, the class of user that is using the device, the channel quality between the first transmitter 603 and the device, and the type of traffic that is being sent to and from the device. In an embodiment the devices may be classified as a low class, a high class, or either based upon the power usage of the devices (e.g., a low powered device may be classified as a low class device). Similarly, the user of the device may be classified as being in a high user class, a low user class, or either based upon such parameters as whether a cooperative reception capability is supported, the device's signal processing power, the device's buffer sizes, combinations of these, or the like. Finally, the channel may be classified on the basis of a signal-to-noise ratio as good, bad, or either, and the traffic type may be classified as described above with respect to the first parameter class or the second parameter class.

Once each of the devices is classified, the QoS requirements and their respective ARQ and HARQ protocols may be looked up by referring to the table in FIG. 3B. Then, returning to FIG. 2, the system 100 can determine if the requirements for each data packet 101 and for each device within the group is met. If not, then the level of the class for the group of data packets 101 is increased to be meet the requirements for the most stringent device within the group of devices. In this fashion the system 100 can ensure that the data packets 101 within the group of data packets 101 have suitable requirements to reach each of the devices within the group of devices.

Finally, once the QoS Manager 105 has determined the first QoS parameter class and the second QoS parameter class for the group of data packets 101, the QoS Manager 105 chooses an appropriate combination of protocols to be applied in the transmission of the group of data packets 101 in a sixth step 211. In an embodiment the QoS Manager 105 may choose an appropriate combination by looking up the appropriate combination from the mapping performed during initialization of the QoS Manager 105.

Figure 6:
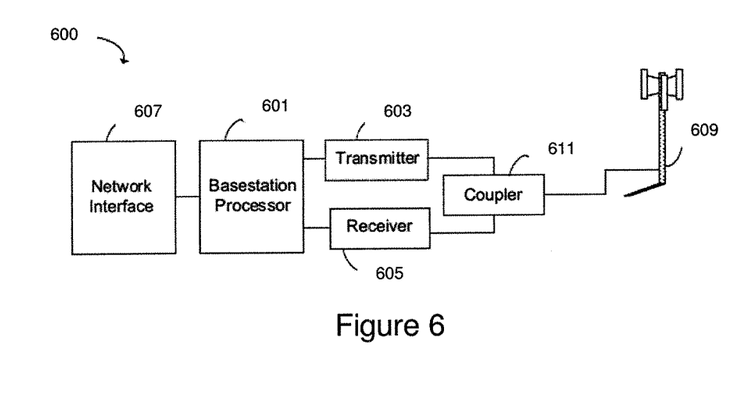
FIG. 6 illustrates a block diagram of an embodiment base station.
Figure 7:
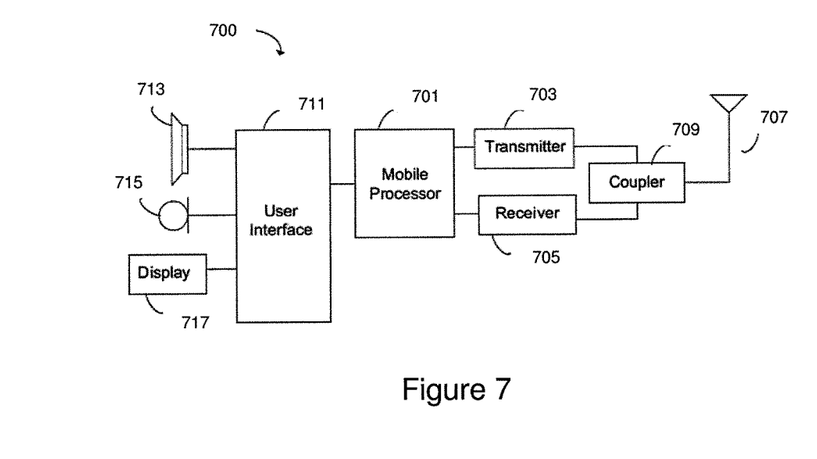
FIG. 7 illustrates a block diagram of an embodiment user device.

In an embodiment the QoS Manager 105 may choose one of a plurality of ARQ protocols and one of a plurality of HARQ protocols to be applied to the group of data packets 101 for a transmission between a first transmitter 600 (part of an embodiment base station 600 that is sending data packets 101) and a second receiver 705 (part of an embodiment mobile station 700 that is receiving data packets 101). In an embodiment the ARQ protocols start by transmitting the data packets 101 to the second receiver 705. If an acknowledgment for each data packet 101 is not received from the second receiver 705 in a pre-determined amount of time (determined for example by the first transmitter 603 starting an acknowledgement timer when it sends the data packet 101), the entire data packet 101 is retransmitted to the second receiver 705. This process is repeated until a successful acknowledgment of the transmission is received. The plurality of ARQ protocols may include acknowledged ARQ protocols, unacknowledged ARQ protocols, transparent ARQ protocols, or the like.

Within the plurality of ARQ protocols, one of the acknowledged ARQ protocols may be a Stop-and-Wait ARQ. In such a ARQ protocol, the first transmitter 603 sends a single frame or data packet 101 and stops further transmissions to the second receiver 705 and waits until it receives an acknowledgment from the second receiver 705. If no acknowledgment is received after a timeout period (kept, e.g., by the acknowledgement timer), the first transmitter 603 will retransmit the data packet 101 and again wait for a successful acknowledgment. To aid in errors, a sequence number may be added to the data packet 101 in a header of the data packet 101.

Another one of the acknowledged ARQ protocols within the plurality of ARQ protocols may be a Go-back-N protocol. In this protocol a number of data packets 101 are transmitted based on a window size without receiving an acknowledgment from the second receiver 705. The first transmitter 603 will include a sequence number with each data packet 101 it sends, and the second receiver 705 will keep track of the sequence numbers, sending an acknowledgment with the sequence number for each data packet 101 that it successfully receives. If a sequence number is out of order or otherwise unexpected by the second receiver 705, the second receiver 705 will ignore the data packet 101.

Once the first transmitter 603 has transmitted each of the data packets 101 within the window, the first transmitter 603 will go back and see for which data packets 101 it has received acknowledgements. Then, taking the sequence number of the last received acknowledgment, the first transmitter 603 will proceed to transmit the next window of data packets 101, starting with the sequence number received in the last acknowledgement receipt.

Yet another one of the plurality of acknowledged ARQ protocols that may be used is a Selective Repeat ARQ. Similar to the Go-back-n protocol, the first transmitter 603 will send a number of the data packets 101 in a window regardless of receiving an acknowledgement notification. However, the second receiver 705 will continue to receive all of the data packets 101 within the window, even if the sequence numbers are out of an expected order. The second receiver 705 will send an acknowledgement containing the sequence number of the earliest data packet 101 that it did not receive. Once the first transmitter 603 has transmitted all of the data packets 101 within the window, the first transmitter 603 will go back and send the data packet 101 received in the acknowledgement that was not received, and then continue where it left off.

Yet another one of the plurality of ARQ protocols may be an unacknowledged ARQ. In this embodiment the unacknowledged ARQ may be utilized in instances where the data packets 101 may be tolerant of error and also request a constant throughput. Such embodiments include the transmission of data packets 101 involved in video or audio streaming applications. In such embodiments the first transmitter 603 may send the data packets 101 to the second receiver 705 with sequence numbers in order to ensure that the data packets 101 are received in sequence. However, the first transmitter 603 will not retransmit the data packets 101 if the data packets 101 have not been successfully decoded by the second receiver 705.

Yet another one of the plurality of ARQ protocols that may be used is a transparent ARQ, which is similar to the unacknowledged ARQ. However, in this protocol there is no signaling being performed in the radio link control layer and the receiver does not maintain a timer or send a sequence number. As such, this protocol is the absence of an ARQ protocol, and none of the other protocols is utilized to package the data packets 101 for transmission.

However, as one of ordinary skill in the art will recognize, while the ARQ protocols listed above are intended to be included within the scope of the embodiments, these are also intended to be only illustrative examples and are not intended to be limiting upon the embodiments. Rather, any suitable ARQ protocol, may additionally or alternatively be utilized, and all such protocols are fully intended to be included within the scope of the embodiments.

In an embodiment, once the QoS Manager 105 has chosen a ARQ protocol to utilize for the group of data packets 101, the QoS Manager 105 will also choose one of a plurality of hybrid ARQ (HARQ) protocols to use for the transmission of the group of data packets 101 from the first transmitter 603 to the second receiver 705. In an embodiment one of the plurality of HARQ protocols is a classic HARQ protocol, wherein the first transmitter 603 adds a forward error correction (FEC) code and an error-detecting code (e.g., a cyclic redundancy check) to each data packet 101 that is sent. If a data packet 101 is received by the second receiver 705 but the second receiver 705 (or, alternately, the mobile processor 701 coupled to the second receiver 705) is unable to decode the data packet 101, the second receiver 705 stores the data packet 101 and sends an acknowledgement message, which may indicate either a successful reception, or a unsuccessful reception, back to the first transmitter 603. The first transmitter 603 may then re-send the data packet 101 to the second receiver 705. When the second receiver 705 receives the retransmission, the second receiver 705 may then use the stored first transmission along with the retransmission to successfully decode the entire data packet 101.

One of the classic HARQ protocols may use chase combining (CC) in order to receive and decode the data packets 101. In such an embodiment the first transmitter 603 transmits the same data packet 101 with the same information (e.g., data and parity bits) to the second receiver 705 each time. The second receiver 705 may then use a combinatorial method such as maximum-ratio combining in order to combine bits of the retransmitted data packet 101 with bits from the originally transmitted data packet 101, in effect enhancing the decoding of the originally transmitted data packet 101.

Another one of the classic HARQ protocols may use incremental-redundancy (IC), wherein each transmission of the data packet 101 contains a different portion of coded bits. For example, multiple sets of coded bits may be generated with each set representing the same bits of data. When a data packet 101 is retransmitted, the first transmitter 603 sends a different set of coded bits than the original transmission. The second receiver 705 uses all of the received coded bits to recover the original data in the data packet 101.

Yet another one of the classic HARQ protocols may include a combination of the chase combining HARQ protocol and the increment-redundancy HARQ protocol. For example, if the maximum coded rate for the data packet 101 is not sufficient, the first transmitter 603 can transmit the coded bits from their beginning and the second receiver 705 may then use chase combining to decode the coded bits.

Yet another one of the plurality of HARQ protocols (besides the classic HARQ protocols described above) may be a stateful HARQ protocol. In this protocol a controlled level of packet error losses is allowed with a re-ordering timer at the second receiver 705. Since it has a reliable frame delivery, the stateful HARQ protocol can ensure that all frames are delivered at the second receiver 705 in order. The second receiver 705 also uses a re-ordering timer to ensure that frames do not take too long to be delivered. If the reordering timer expires, the second receiver 705 sends an acknowledgment for some or all of the yet unacknowledged packets to indicate to the first transmitter 603 to move on to the next data packet 101. The reordering timer therefore ensures that packet latency never goes over a preset limit.

Yet another one of the plurality of HARQ protocols is a rateless HARQ protocol. In this protocol the first transmitter 603 transmits combinations of Incremental Redundancy (IR) parts of the frame, until the second receiver 705 can finally decode the frame. The advantage of rateless HARQ is that the number of frame fragments can be infinite meaning that the first transmitter 603 can start with just one fragment, disregarding Signal-to-Interference Noise (SINR) measurements, and just keep transmitting new fragments until the second receiver 705 finally acknowledges a successful reception.

However, as one of ordinary skill in the art will recognize, the HARQ protocols described above are intended to be illustrative and are not intended to be limiting upon the present embodiments. Any suitable HARQ protocol, or even the choice of using no HARQ protocol, may additionally or alternatively be utilized, and all such alternatives are fully intended to be included within the scope of the embodiments.

Finally, once a HARQ protocol has been chosen by the QoS Manager 105, the protocol parameters of the specific HARQ protocol chosen is set in an eighth step 213. In an embodiment in which the HARQ protocol uses a BLER target to measure the transmission of the data packets 101, the BLER target may be set to be a low BLER target, a medium BLER target, a very low BLER target, or even to set it so that there is no BLER target.

Once an appropriate combination of ARQ protocols and HARQ protocols have been determined for the group of data packets 101 and the appropriate protocol parameters have been set, the QoS Manager 105 will additionally generate a selection signal (not individually illustrated) in order to notify the second receiver 705 which combination of ARQ protocols and HARQ protocols is being used during the transmission of the group of data packets 101. In an embodiment a number may be used to represent the combination of ARQ protocols and HARQ protocols. For example, in an embodiment the following table may be utilized to generate the selection signal:

| Signal value | ARQ protocol | HARQ protocol |
| --- | --- | --- |
| 0 | No ARQ | No HARQ |
| 1 | No ARQ, | Classic HARQ |
| 2 | No ARQ, | Stateful HARQ |
| 3 | No ARQ, | Rateless HARQ |
| 4 | Unacknowledged ARQ | Classic HARQ |
| 5 | Unacknowledged ARQ | Stateful HARQ |
| 6 | Unacknowledged ARQ | Rateless HARQ |
| 7 | Acknowledged ARQ | Classic HARQ |
| 8 | Acknowledged ARQ | Stateful HARQ |
| 9 | Acknowledged ARQ | Rateless HARQ |

However, while a table such as the one described above is one such method of generating the selection signal, the generation of the selection signal is not intended to be so limited. Rather, any suitable method of generating an indication to the second receiver 705 as to which combination of protocols is being utilized may alternatively be utilized, and all such methods are fully intended to be included within the scope of the embodiments.

Figure 4:
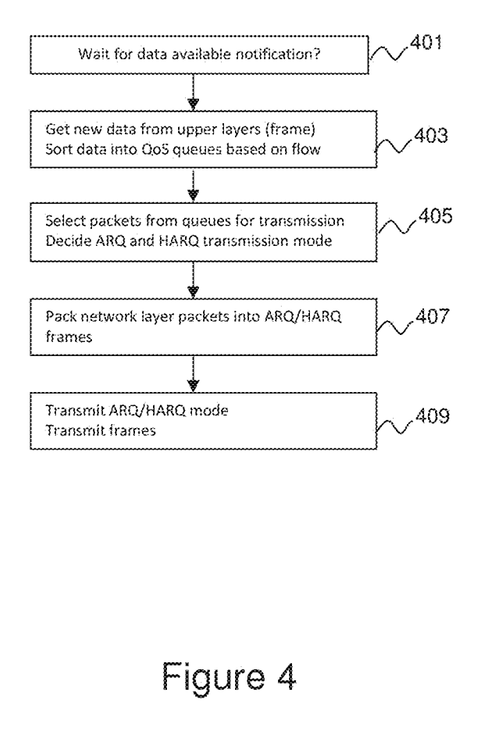
FIG. 4 illustrates a method for transmitting data in accordance with an embodiment.

FIG. 4 illustrates a method for transmitting each data packet 101 once the appropriate protocols have been chosen and the selection signal has been generated. In an embodiment the system 100, by way of the QoS Manager 105, selects the ARQ protocol and the HARQ protocol to be used for the group of data packets 101. Once the ARQ protocol and the HARQ protocol have been chosen, the first transmitter 603 prepares each of the data packets 101 for transmission. For example, headers may be generated and attached to each of the individual ones of the data packets 101. Additionally, sequence numbers or other header information related to the ARQ protocol and HARQ protocol may also be included within the header.

Once the individual data packets 101 are individually ready for transmission, the group of data packets 101 are bundled into a frame (not individually illustrated). In an embodiment all of the data packets 101 in the group of data packets are bundled into a single ARQ/HARQ transport block (TB). Alternatively, each of the data packets 101 within the group of data packets 101 that have the same QoS requirements may be placed into one ARQ frame and then all of the selected data packets 101 are placed into one HARQ TB.

The first transmitter 603 may also generate a header for the frame, and the header will also contain the selection signal indicating to the second receiver 705 which combination of ARQ protocols and HARQ protocols is being utilized during the transmission of the frame. In an embodiment the selection signal may be included as a control bit in a pre-determined location within the header of the frame.

In an alternative embodiment, the selection signal may be split into a first selection signal and a second selection signal. In an embodiment the first selection signal is an indication of which HARQ protocol is being utilized and the second selection signal is an indication of which ARQ protocol is being utilized. The first selection signal is then placed and transmitted within the header of the frame while the second selection signal is placed and transmitted within the header of the individual data packets 101.

In yet another alternative embodiment, the selection signal may be sent to the second receiver 705 independently from the frame containing the individual data packets 101. For example, the selection signal may be transmitted to the second receiver 705 prior to the transmission of the frame. In this fashion, the second receiver 705 will be ready for the frame without needing to decode the header of the frame prior to decoding.

FIG. 4 illustrates a flow chart that may be utilized by the system 100 in order to transmit the data packets 101 using the dynamic choosing of ARQ/HARQ protocols. In a first transmission step 401, the scheduler 103 waits for a notification that data packets 101 are available to be transmitted. In a second transmission step 403, the data packets 101 are sorted into queues based on the QoS parameters and classes. In a third transmission step 405, a group of the data packets 101 is selected from the queues by the scheduler 103 and the packet scheduler 108 for transmission and a decision is made by the QoS manager 105 regarding which combination of ARQ protocols will be used for the group of the data packets 101. In a fourth transmission step 407, the group of data packets 101 is packed into a frame for transmission and, in a fifth transmission step 409, the frame is transmitted from the system 100 to the first transmitter 603 and the first antenna 609 along with an indication of which combination of ARQ protocols is to be used with the frame. If the data packets 101 are not successfully received, the system 100 may then re-send the data packets 101 based upon the appropriate protocols chosen by the QoS Manager 105.

Figure 5:
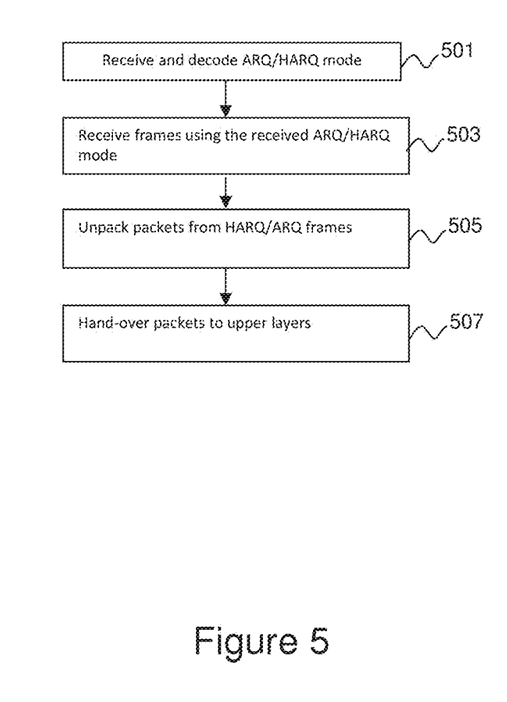
FIG. 5 illustrates a method for receiving data in accordance with an embodiment.

FIG. 5 illustrates a flow chart that may be utilized by the user equipment 700 with the second receiver 705 to receive the frame containing the group of data packets 101. In a first receiving step 501 the second receiver 705 receives and decodes the selection signal from the first transmitter 603. The selection signal may be either transmitted separately from the frame or else as part of the frame itself (e.g., as control bits in the header of the frame). In a second receiving step 503 the second receiver 705 receives the frame containing the group of data packets 101 and, in a third receiving step 505, the second receiver 705 unpacks and decodes the group of data packets 101 from the frame and, the second receiver 705 signals back to the system 100 the acknowledgements and sequence numbers as stated by the combination of ARQ protocols used to transmit the frame. Once the second receiver 705 has successfully received the group of data packets 101, the second receiver 705 will transmit the data packets to an upper layer of the second receiver 705 in a fourth receiving step 507.

Optionally, in one of the transmissions back to the system, the second receiver 705 may send QoS measurements, such as the time that the second receiver 705 successfully received individual ones of the data packets 101, back to the system 100. Such QoS measurements may be utilized by the system 100 to make the process more efficient over time.

A block diagram of an embodiment base station 600 is illustrated in FIG. 6. Base station 600 has a base station processor 601 coupled to a first transmitter 603, a first receiver 605, and a first network interface 607. The first transmitter 603 and the first receiver 605 are coupled to a first antenna 609 via a first coupler 611. The base station processor 601 executes embodiment algorithms as described above in order to process the data packets 101 and to choose the combination of ARQ and HARQ protocols, apply these protocols to the data packets 101 prior to transmission, and forward the packaged data packets 101 to the first transmitter 603 for transmission. In embodiments of the present invention, base station 600 is configured to operate in a LTE network using an OFDMA downlink channel divided into multiple sub-bands. In alternative embodiments, other systems, network types and transmission schemes can be used.

A block diagram of an embodiment user device 700 is illustrated in FIG. 7. The user device 700 can be implemented, for example, as a cellular telephone, or other mobile communication device, such as a computer or network enabled peripheral. Alternatively, the user device 700 can be a non-mobile device, such as a desktop computer with wireless network connectivity. The user device 700 has a mobile processor 701, a second transmitter 703 and a second receiver 705, which are coupled to a second antenna 707 via a second coupler 709. The user interface 711 is coupled to the mobile processor 701 and provides interfaces to a loudspeaker 713, a microphone 715, and a display 717, for example. Alternatively, the user device 700 may have a different configuration with respect to the user interface 711, or the user interface 711 may be omitted entirely.

Although the present embodiments and their advantages have been described in detail, it should be understood that various changes, substitutions and alterations can be made herein without departing from the spirit and scope of the disclosure as defined by the appended claims. For example, many of the features and functions discussed above can be implemented in software, hardware, or firmware, or a combination thereof. As another example, it will be readily understood by those skilled in the art that the precise order of process steps may be varied while remaining within the scope of the present disclosure.

In particular, it will be appreciated by one of ordinary skill in the art that the above embodiments are not limited to only a transmission of data utilizing solely data packets. Rather, the above described embodiments may be utilized with any approach of data transmission that may utilize data packets. For example, the embodiments may be utilized in a semi-static method of data transmission that uses a combination of packets and flows in order to transmit data. This and any other methods that utilize data packets may alternatively be used, and all such methods are fully intended to be included within the scope of the embodiments. Additionally, the embodiments are not limited to a wireless method of transmission and may alternatively be utilized in any other suitable method, such as transmission through a wired network.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for wirelessly transmitting data, the method comprising:
   receiving a first data packet and a second data packet in a single traffic flow to be transmitted, the single traffic flow coming from a single source address and comprising a plurality of data packets, at least the first data packet in the single traffic flow and the second data packet in the single traffic flow having different Quality of Service (QoS) requirements;
   selecting a first retransmission protocol from a first plurality of retransmission protocols based on a first QoS parameter of the first data packet and a second QoS parameter of the first data packet that is different from the first QoS parameter of the first data packet, the first QoS parameter and the second QoS parameter of the first data packet corresponding to a first QoS requirement of the first data packet;
   selecting a second retransmission protocol from a second plurality of retransmission protocols based on the first QoS parameter and the second QoS parameter of the first data packet, the first retransmission protocol and the second retransmission protocol being selected for transmitting the first data packet, wherein a combination of the selected first retransmission protocol and the selected second retransmission protocol is mapped to a combination of the first QoS parameter and the second QoS parameter of the first data packet;
   transmitting an indication of the selected first retransmission protocol;
   transmitting an indication of the selected second retransmission protocol;
   selecting a third retransmission protocol from the first plurality of retransmission protocols based on a first QoS parameter of the second data packet and a second QoS parameter of the second data packet;
   selecting a fourth retransmission protocol from the second plurality of retransmission protocols based on the first QoS parameter and the second QoS parameter of the second data packet, the first QoS parameter and the second QoS parameter of the second data packet corresponding to a second QoS requirement of the second data packet, a combination of the selected third retransmission protocol and the selected fourth retransmission protocol being different from the combination of the selected first retransmission protocol and the selected second retransmission protocol;
   transmitting an indication of the selected third retransmission protocol; and
   transmitting an indication of the selected fourth retransmission protocol.

2. The method of claim 1, wherein selecting the first retransmission protocol and selecting the second retransmission protocol are performed together.

3. The method of claim 1,
   wherein selecting the first retransmission protocol and selecting the second retransmission protocol comprises selecting a combined retransmission protocol based on a mapping between a plurality of combined retransmission protocols and a plurality of combined QoS parameters, wherein each of the plurality of combined retransmission protocols comprises two different retransmission protocols, and each of the plurality of combined QoS parameters comprises two different QoS parameters.

4. The method of claim 1, wherein:
   selecting the first retransmission protocol from the plurality of first retransmission protocols comprises selecting an Automatic Repeat reQuest (ARQ) protocol from a plurality of ARQ protocols.

5. The method of claim 4, wherein:
   selecting the ARQ protocol from the plurality of ARQ protocols comprises selecting an absence of an ARQ protocol.

6. The method of claim 4, wherein:
   selecting the second retransmission protocol from the plurality of second retransmission protocols comprises selecting a Hybrid ARQ (HARQ) protocol from a plurality of HARQ protocols.

7. The method of claim 6, wherein:
   selecting the HARQ protocol from the plurality of HARQ protocols comprises selecting an absence of a HARQ protocol.

8. The method of claim 6, wherein:
   transmitting an indication of the selected first retransmission protocol and transmitting an indication of the selected second retransmission protocol comprise transmitting the first data packet with the first retransmission protocol and the second retransmission protocol.

9. The method of claim 8, wherein:
   selecting a HARQ protocol comprises selecting a rateless HARQ protocol.

10. The method of claim 8, wherein:
    the first QoS parameter of the first data packet is an error tolerance parameter.

11. The method of claim 8, wherein:
    the second QoS parameter of the first data packet is a latency tolerance parameter.

12. The method of claim 8, wherein:

the first QoS parameter of the first data packet is a first QoS parameter of the single traffic flow; and the second QoS parameter of the first data packet is a second QoS parameter of the single traffic flow.

13. The method of claim 8, further comprising:

transmitting the second data packet with the third retransmission protocol and the fourth retransmission protocol.

14. The method of claim 13, wherein:

the third retransmission protocol is different from the first retransmission protocol.

15. The method of claim 13, wherein:

the fourth retransmission protocol is different from the second retransmission protocol.

16. The method of claim 8, further comprising:

receiving a third data packet in the single traffic flow; and transmitting the third data packet with the first retransmission protocol and the second retransmission protocol.

17. The method of claim 8, further comprising:

placing the first data packet in a selected one of a plurality of queues based on the first and second QoS parameters; and wherein:

selecting the ARQ protocol based on the first QoS parameter and the second QoS parameter of the first data packet comprises selecting the ARQ protocol based on the selected queue; and selecting the HARQ protocol based on the first QoS parameter and the second QoS parameter of the first data packet comprises selecting the HARQ protocol based on the selected queue.

18. The method of claim 8, wherein:

at least one of the first and second QoS parameters of the first data packet is based on one of an IP source address, an IP destination address, a transmission protocol, a source port number, a destination port number, and a differentiated services code point (DSCP) associated with the first data packet.

19. A quality of service (QoS) Manager, comprising:

a processor; and a non-transitory computer readable storage medium storing programming for execution by the processor, the programming including instructions to:

receive a first data packet and a second data packet in a single traffic flow to be transmitted, the single traffic flow coming from a single source address and comprising a plurality of data packets, at least the first data packet in the single traffic flow and the second data packet in the single traffic flow having different Quality of Service (QoS) requirements;

select a first retransmission protocol from a first plurality of retransmission protocols based on a first QoS parameter of the first data packet and a second QoS parameter of the first data packet that is different from the first QoS parameter, the first QoS parameter and the second QoS parameter of the first data packet corresponding to a first QoS requirement of the first data packet;

select a second retransmission protocol from a second plurality of retransmission protocols based on the first QoS parameter and the second QoS parameter of the first data packet, the second retransmission protocol being different than the first retransmission protocol, and the first retransmission protocol and the second retransmission protocol being selected for transmitting the first data packet, wherein a combination of the selected first retransmission protocol and the selected second retransmission protocol is mapped to a combination of the first QoS parameter and the second QoS parameter of the first data packet;

generate an indication of the selected first retransmission protocol;

generate an indication of the selected second retransmission protocol;

select a third retransmission protocol from the first plurality of retransmission protocols based on a first QoS parameter of the second data packet and a second QoS parameter of the second data packet;

select a fourth retransmission protocol from the second plurality of retransmission protocols based on the first QoS parameter and the second QoS parameter of the second data packet, the first QoS parameter and the second QoS parameter of the second data packet corresponding to a second QoS requirement of the second data packet, a combination of the selected third retransmission protocol and the selected fourth retransmission protocol being different from the combination of the selected first retransmission protocol and the selected second retransmission protocol;

generate an indication of the selected third retransmission protocol; and generate an indication of the selected fourth retransmission protocol.

20. The QoS Manager of claim 19, wherein the instructions to select the first retransmission protocol and the instructions to select the second retransmission protocol comprise:

instructions to select a combined retransmission protocol based on a mapping between a plurality of combined retransmission protocols and a plurality of combined QoS parameters, a combined retransmission protocol comprising the first retransmission protocol and the second retransmission protocol, wherein each of the plurality of combined retransmission protocols comprises two different retransmission protocols, and each of the plurality of combined QoS parameters comprises two different QoS parameters.

21. The QoS Manager of claim 19, wherein:

the instructions to select the first retransmission protocol from the plurality of first retransmission protocols comprise instructions to select an Automatic Repeat reQuest (ARQ) protocol from a plurality of ARQ protocols.

22. The QoS Manager of claim 21, wherein:

the instructions to select the second retransmission protocol from the plurality of second retransmission protocols comprise instructions to select a Hybrid ARQ (HARQ) protocol from a plurality of HARQ protocols.

23. The QoS Manager of claim 22, wherein:

the first data packet is transmitted with the first retransmission protocol and the second retransmission protocol.

24. The QoS Manager of claim 23, wherein the second data packet is transmitted with the third retransmission protocol and the fourth retransmission protocol.

25. The QoS Manager of claim 22, wherein:

the instructions to select a HARQ protocol from a plurality of HARQ protocols comprise instructions to select a rateless HARQ protocol.

26. The QoS Manager of claim 19, wherein:
the first QoS parameter of the first data packet is an error tolerance parameter and the second QoS parameter of the first data packet is a latency tolerance parameter.

* * * * *